United States Patent
Hunter

(10) Patent No.: US 7,022,504 B2
(45) Date of Patent: Apr. 4, 2006

(54) METHOD FOR THE BACTERIALLY ASSISTED HEAP LEACHING OF CHALCOPYRITE

(75) Inventor: Colin John Hunter, Dalkeith (AU)

(73) Assignee: Bioheap Limited, (AU)

( * ) Notice: Subject to any disclaimer, the term of this patent is extended or adjusted under 35 U.S.C. 154(b) by 244 days.

(21) Appl. No.: 10/469,937

(22) PCT Filed: Feb. 22, 2002

(86) PCT No.: PCT/AU02/00191

§ 371 (c)(1),
(2), (4) Date: Sep. 5, 2003

(87) PCT Pub. No.: WO02/070757

PCT Pub. Date: Sep. 12, 2002

(65) Prior Publication Data

US 2004/0091984 A1    May 13, 2004

(30) Foreign Application Priority Data

Mar. 6, 2001   (AU) ................... PR3551

(51) Int. Cl.
*C12P 3/00* (2006.01)
(52) U.S. Cl. .................................... 435/168
(58) Field of Classification Search ............... 435/168
See application file for complete search history.

(56) References Cited

U.S. PATENT DOCUMENTS

| | | | |
|---|---|---|---|
| 4,113,848 A * | 9/1978 | Parker et al. | 423/519.2 |
| 4,497,778 A * | 2/1985 | Pooley | 423/27 |
| 4,728,082 A * | 3/1988 | Emmett et al. | 266/168 |
| 4,732,608 A * | 3/1988 | Emmett et al. | 423/22 |
| 5,491,078 A * | 2/1996 | Clark | 435/168 |
| 5,779,762 A | 7/1998 | Kohr et al. | |
| 5,919,674 A * | 7/1999 | Tunley | 435/168 |
| 6,110,253 A * | 8/2000 | Kohr et al. | 75/712 |
| 6,482,373 B1* | 11/2002 | Hannaford et al. | 423/47 |

FOREIGN PATENT DOCUMENTS

| | | |
|---|---|---|
| FR | 2 640 284 A | 6/1990 |
| WO | WO 00/37690 A1 | 6/2000 |
| WO | WO 00/71763 A1 | 11/2000 |
| WO | WO 01/18264 A1 | 3/2001 |
| WO | WO 01/31072 A1 | 5/2001 |
| WO | WO 01/44519 A1 | 6/2001 |

OTHER PUBLICATIONS

M. Dopson et al., "Potential Role of *Thiobacillus Caldus* in Arsenopyrite Bioleaching, *Applied and Environmental Microbiology*," 65(1):36-40, 1999.
M. Vasquez et al., "Chemolithotrophic Bacteria in Copper Ores Leached at High Sulfuric Acid Concentration," *Applied and Environmental Microbiology*, 63(1):332-334, 1997.

* cited by examiner

*Primary Examiner*—Herbert J. Lilling
(74) *Attorney, Agent, or Firm*—Rothwell, Figg, Ernst & Manbeck, PC

(57) ABSTRACT

A method for the bacterially assisted heap leaching of chalcopyrite includes providing a chalcopyrite containing ore heap to oxidize sulphide minerals therein, the heap containing and/or being inoculated with a sulphide oxidizing bacterial culture that either does not oxidize ferrous to ferric, or is inefficient at doing so. At least a first leach solution pond (or other suitable container) is provided, from which feed solution is fed to the heap, and which receives leach solution from the heap. A portion of the leach solution is bled and passed to metals recovery.

13 Claims, 3 Drawing Sheets

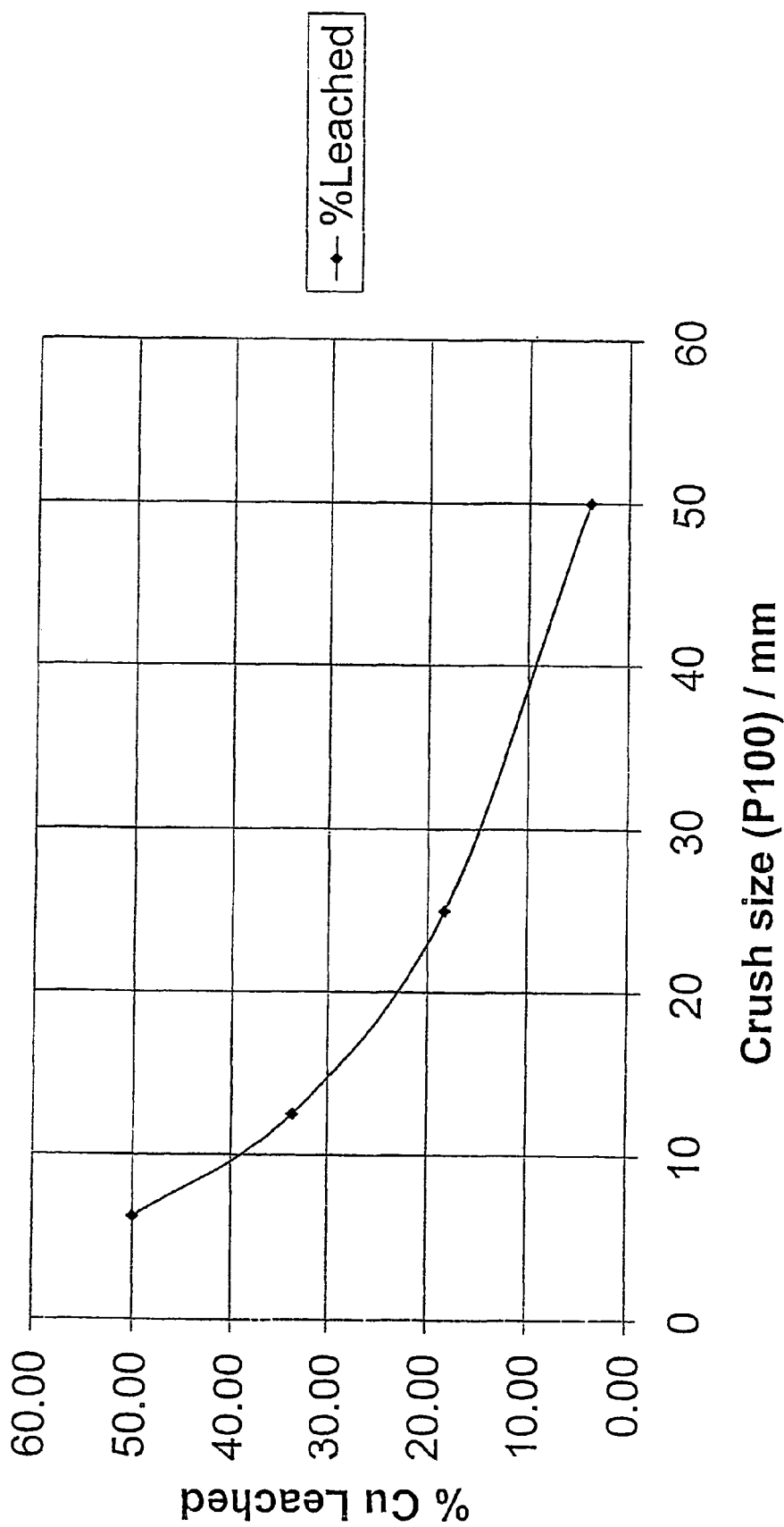

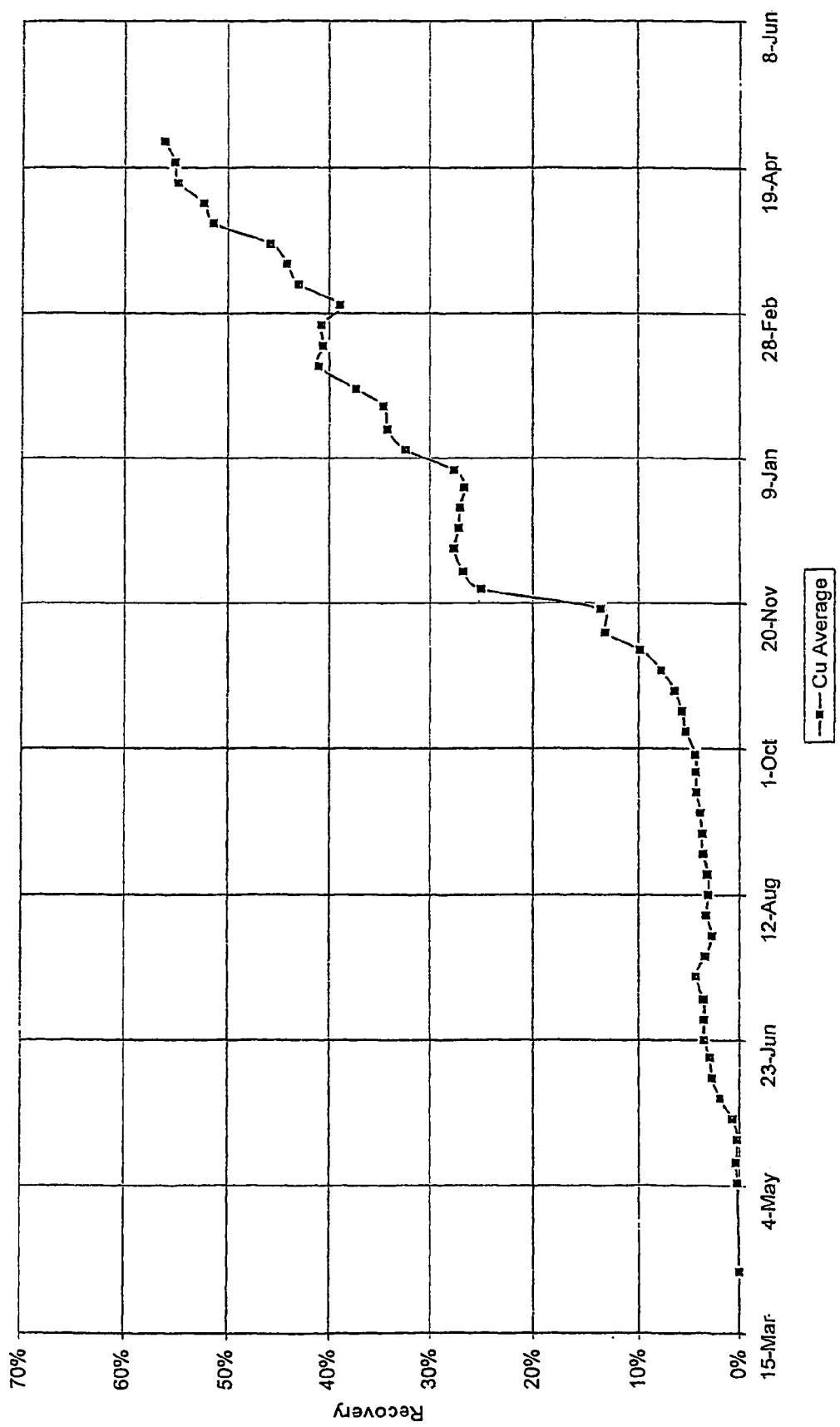

METHOD FOR THE BACTERIALLY ASSISTED HEAP LEACHING OF CHALCOPYRITE

FIELD OF THE INVENTION

The present invention relates to a method for the bacterially assisted heap leaching of chalcopyrite. More particularly, the bacterially assisted heap leach method of the present invention is intended for use in the recovery of copper in sulphide ores, the copper being present in the form of chalcopyrite.

BACKGROUND ART

The recovery of base metals from sulphide ores by bacterially assisted heap leaching is presently restricted to secondary copper sulphide minerals, such as chalcocite and covellite. Chalcopyrite, a primary copper sulphide mineral, is a notable exception and can not presently be successfully leached in a heap. The common practice with chalcopyrite ores is to produce a concentrate by froth flotation, for feeding to a smelter.

Attempts to leach chalcopyrite in weak to moderately strong sulphuric acid solution, with the addition of ferric as an oxidant, results in the surface passivation of the chalcopyrite, causing the reaction to either stop, or slow down to an unacceptable rate. Similarly, attempts to leach chalcopyrite with bacteria are hindered by the same surface passivation phenomenon. The mechanism by which this passivation occurs, and the nature of the passivating layer itself, is not fully understood.

The method of the present invention has as one object thereof to overcome the abovementioned problems associated with the prior art, or to at least provide a useful alternative thereto.

The preceding discussion of the background art is intended to facilitate an understanding of the present invention only. It should be appreciated that the discussion is not an acknowledgement or admission that any of the material referred to was part of the common general knowledge in Australia as at the priority date of the application.

Throughout this specification, unless the context requires otherwise, the word "comprise", or variations such as "comprises" or "comprising", will be understood to imply the inclusion of a stated integer or group of integers but not the exclusion of any other integer or group of integers.

DISCLOSURE OF THE INVENTION

In accordance with the present invention there is provided a method for the bacterially assisted heap leaching of chalcopyrite, the method characterised by the steps of:
  providing a chalcopyrite containing ore heap to oxidise sulphide minerals therein, the heap containing and/or being inoculated with a sulphide oxidising bacterial culture that either does not oxidise ferrous to ferric, or is inefficient at doing so;
  providing at least a first leach solution pond (or other suitable container), from which feed solution is fed to the heap, and which receives leach solution from the heap; and
  bleeding a portion of the leach solution and passing same to a means for metals recovery.

Preferably, the first leach solution pond is maintained with a low ferric concentration relative to that of ferrous.

Preferably, the first leach solution pond is maintained with an oxidation reduction potential of below 500 mV relative to Ag/AgCl$_2$ standard reference.

Still preferably, the first leach solution pond is maintained such that the prevailing chemical conditions are conducive to leaching the chalcopyrite whilst being non-conducive to surface passivation.

Preferably, the ore heap is aerated at or near a base thereof.

The oxidation of the chalcopyrite is preferably achieved through the action of chemolithotrophic bacteria.

The method of the present invention may additionally comprise providing a biological contactor inoculated with ferrous oxidising bacteria and a second leach solution pond from which leach solution is fed to the biological contactor and which receives leach solution from the biological contactor.

Preferably, leach solution from the first leach pond is able to be fed to the biological contactor.

Still preferably, leach solution is able to be fed from the second leach pond to the first leach pond, whereby the level of ferric and/or the pH value in the first leach pond may be controlled to a large extent.

Still further preferably, leach solution is bled from the biological contactor for passing to a means for metals recovery, the levels of ferric therein facilitating metal recovery.

The biological contactor may be provided in the form of a second heap. The second heap is preferably formed of relatively inert waste rock inoculated with ferrous oxidising bacteria.

BRIEF DESCRIPTION OF THE DRAWINGS

The present invention will now be described, by way of example only, with reference to one embodiment thereof and the accompanying drawing:

FIG. 2 is graphical representation of the °/ copper leached in a nitric acid leach against crush size for a chalcopyrite containing ore in accordance with Example 2; and FIG. 3 is a graphical representation of copper recoveries in accordance with Example 2.

BEST MODE(S) FOR CARRYING OUT THE INVENTION

Figure 1:
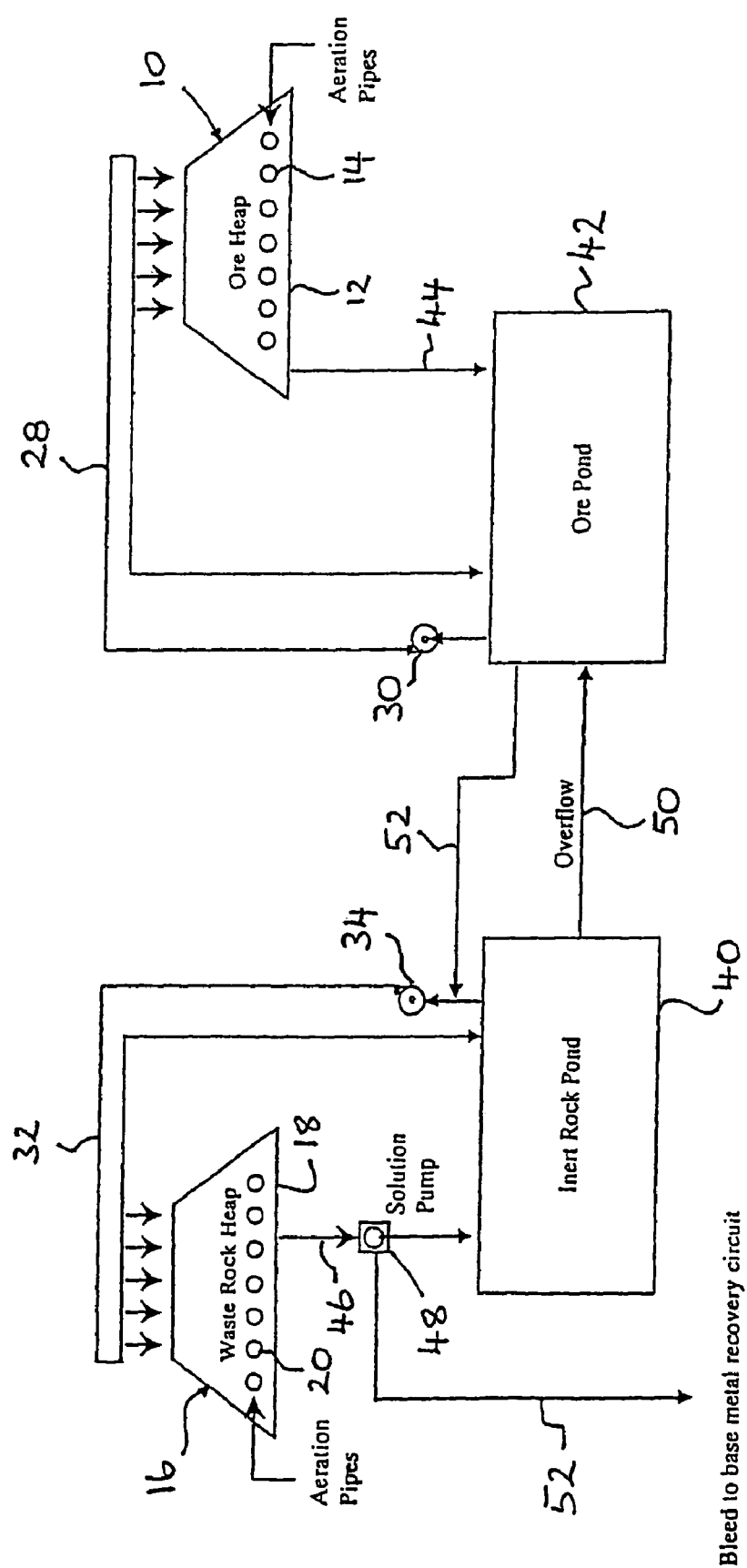
FIG. 1 is a schematic representation or flow sheet of a method for the bacterially assisted heap leaching of chalcopyrite in accordance with one embodiment of the present invention.

In the exemplified embodiment it is assumed that the preferred form of iron in the solution bleed stream to the base metal recovery circuit is the ferric form. The oxidation of the ferrous to ferric in the leach solution is achieved by passing same through a biological contactor, in the form of a second heap constructed from barren rock or low-grade ore.

In FIG. 1 there is shown a flow sheet for the bacterially assisted heap leaching of a whole ore or a fraction thereof, by the action of chemolithotrophic bacteria, in accordance With the present invention.

A disseminated sulphide ore is stacked in a heap 10 on an impermeable leach pad 12. It is envisaged that the disseminated sulphide ore may have undergone one or more pre-treatments, for example agglomeration, to improve its permeability, or some form of upgrading step to improve its base metal content.

The heap 10 has slotted aeration pipes 14 inserted into a base of the heap 10 to provide a source of oxygen and carbon to the bacteria present in the disseminated sulphide ore. These bacteria are encouraged to multiply and populate the heap, and consequently oxidise the sulphide minerals.

It is envisaged that the process of the present invention may require a different bacterial species to populate the ore heap than that occurring naturally. Such a species would have to be introduced thereto by way of inoculation. This may be achieved by adding a solution containing the preferred bacteria to the material to be treated before, during and/or after stacking of the heap 10.

The heap 10 is inoculated with a bacterial culture that does not oxidise ferrous, or is inefficient at doing so, and may include, but is not limited to, *Sulfobacillus thermosulfidooxidans* and *Thiobacillus caldus*. A preferred bacterial culture has been deposited at the Australia Government Analytical Laboratories under accession No. NM99/07541.

A biological contactor, for example a second heap 16 formed of a relatively inert waste rock is provided on a further impermeable leach pad 18. The second heap 16 is similarly provided with slotted aeration pipes 20 near the base thereof. The heap 16 is inoculated with ferrous oxidising bacteria, for example *Thiobacillus ferrooxidans*, which may or may not be indigenous to the heap 16.

Two ponds are provided, including an inert rock pond 40 (a second pond) and an ore pond 42 (a first pond). The ore pond 42 receives leach solution from the ore heap 10 by way of gravity feed line 44. The ore heap 10 receives leach solution from the pond 42 by way of the feed line 28. Any leach solution not fed to the heap 10 is returned to the pond 42.

The waste rock heap 16 receives leach solution from the inert rock pond 40 by way of the feed line 32. Any leach solution not fed to the heap 16 is returned to the pond 40. The pond 40 receives leach solution from the heap 16 by way of gravity feed line 46 in which is provided a pump 48.

Overflow from the inert rock pond 40 is directed to the ore pond 42 by way of an overflow line 50. Control over the volume of solution transferred via line 50, allows for control over the ferric level in the ore pond 42.

Liquor from the ore pond 42 is, in addition to being fed to the heap 10, fed to the heap 16 by way of intermediate line 52 and the feed line 32.

A bleed line 52 is provided in the gravity feed line 46 from the heap 16 and is used to bleed leach solution now deficient in ferrous when compared to the leach solution of pond 42, out of the circuit shown in FIG. 1, and into a means for metals recovery. Conventional hydrometallurgical means may then be used to recover the base metals from this leach solution.

The use of separate ponds 40 and 42 allows greater flexibility in the circuit than possible with a single pond. For example, the two heaps may be run under differing conditions of pH and ferrous and ferric concentration. As noted above, control over the volume of solution transferred via line 50, allows over control over ferric levels in the ore pond 42.

In this way the ore heap solution pond can be maintained such that the prevailing chemical conditions are conducive to leaching the chalcopyrite whilst being non-conducive to surface passivation. This would involve, but not be limited to, maintaining a low ferric concentration in solution. The ORP (oxidation reduction potential), of the solution may, in some circumstances be taken as an indication of the relative concentrations of ferrous and ferric.

It is envisaged that the heating or cooling of the leach solution at some point in the flow sheet shown in FIG. 1 may prove advantageous.

The biological contactor may, it is envisaged, alternately be provided in the form of a packed column or rotating biological contactor.

It is further envisaged that the leach solution may preferably be recycled through each heap 10 and 16 more than once in order to increase the level of dissolved metals. Further, some form of pH control may prove advantageous.

The process of the present invention provides for the economic recovery of copper and other base metal sulphides, for example cobalt, nickel and zinc, from their ores. It is envisaged that the capital and operating costs of base metals production by the process of the present invention will compare favourably with conventional recovery processes. Still further, it is envisaged that the process can be applied to mineral deposits of lower base metal value than would typically be economically viable using conventional or prior art methods.

The present invention will now be described with reference to two examples. However, it is to be understood that the following examples are not to limit the above generality of the invention.

EXAMPLE 1

Two stirred vessel bacterial leach tests were conducted on 300 g samples of the same chalcopyrite ore. The ore was finely ground (79% passing 200 mesh) and made up in a slurry with 3 Liters of a solution containing bacteria. Aside from the type of bacteria used in the tests, all other conditions were the same, being a temperature of 45° and a pH of 1.00. The results are shown in Tables 1 and 2.

In a first test, see Table 1, the bacterial culture contained bacteria indigenous to the ore and having iron oxidising properties. As a result, ferric was the predominant iron species present during the first test and the copper leached after 36 days was only 34.22% of that initially present in the ore.

In a second test, see Table 2, non-iron oxidising bacteria were used. Consequently, ferrous was the predominant iron species present during the leach and after 19 days of leaching, 98.78% of the copper was leached.

EXAMPLE 2

Samples of the same chalcopyrite containing ore as used in Example 1 was crushed to various levels of fineness and subjected to a concentrated nitric acid leach test so as to determine the liberation characteristics of the chalcopyrite that is contained in the ore. The results of this testing are shown in FIG. 2.

The results indicate that at a crush size of 100% passing 6.25 mm, 50% of the chalcopyrite is exposed and is available for leaching.

A nominal 5000 tonne heap of the same ore was subsequently constructed, the ore having a crush size of 100% passing 7.5 mm. The heap was operated in accordance with the present invention as described hereinabove. The resulting copper leach rate is shown in FIG. 3. The final copper leach extraction is close to that predicted by the nitric acid leach test noted above. This suggests that all, or almost all, of the chalcopyrite that was available to the leach, was successfully leached under these conditions.

Modifications and variations such as would be apparent to the skilled addressee are considered to fall within the scope of the present invention.

TABLE 1

Feed: 300 g Desseminated Ore (79% passing 200 mesh)
3 L of Indigenous Culture
Head Grade: Fe (%) 12.5, Cu (%) 0.9, Ni (%) 0.62, Co (ppm) 238, S (%) 4.05    Temperature: 45° C.    Operating pH: 1.00

| Day | ORP mV | DO (mg/L) | pH 1 | pH 2 | Acid Added (ml) | Cum. Acid (ml) | Fe++ (g/l) | Fe+++ (g/l) | Fe Tot (g/l) | Ni (mg/L) | Co (mg/L) | Cu (mg/L) | Fe (%) | Ni (%) | Co (%) | Cu (%) |
|---|---|---|---|---|---|---|---|---|---|---|---|---|---|---|---|---|
| 0 | 408 | | 2.19 | 0.94 | 31.0 | 31.0 | 3.07 | 1.24 | 4.31 | 47 | 1.81 | 226 | 0.00 | 0.00 | 0.00 | 0.00 |
| 1 (1 am) | 419 | 3.2 | 1.07 | 0.95 | 8.0 | 39.0 | | | | | | | | | | |
| 1 (1 pm) | 422 | | 1.02 | 0.95 | 5.0 | 44.0 | | | | | | | | | | |
| 2 | 432 | 2.8 | 1.06 | 0.96 | 8.0 | 52.0 | | | | | | | | | | |
| 3 | 452 | 3.9 | 1.02 | 0.96 | 5.0 | 57.0 | | | | | | | | | | |
| 4 | 464 | 3.1 | 1.06 | 1.00 | 3.0 | 60.0 | | | | | | | | | | |
| 5 | 470 | 3.2 | 1.03 | 1.00 | 2.0 | 62.0 | 2.85 | 5.38 | 8.23 | 207 | 4.81 | 286 | 31.36 | 25.81 | 12.61 | 6.67 |
| 6 | 474 | 4.0 | 1.03 | 1.00 | 2.0 | 64.0 | | | | | | | | | | |
| 7 | 475 | 3.2 | 1.02 | 1.02 | 0.0 | 64.0 | | | | | | | | | | |
| 8 | 474 | 2.2 | 1.10 | 1.00 | 6.0 | 70.0 | 2.96 | 6.12 | 9.08 | 293 | 7.32 | 301 | 38.16 | 39.68 | 23.15 | 8.33 |
| 9 | 476 | 2.7 | 0.99 | 0.99 | 0.0 | 70.0 | | | | | | | | | | |
| 10 | 475 | 2.7 | 1.00 | 1.00 | 0.0 | 70.0 | | | | | | | | | | |
| 11 | 475 | 3.5 | 1.00 | 1.00 | 0.0 | 70.0 | | | | | | | | | | |
| 12 | 476 | 3.3 | 1.03 | 1.00 | 2.0 | 72.0 | 2.79 | 6.74 | 9.53 | 390 | 9.24 | 387 | 41.76 | 55.32 | 31.22 | 17.89 |
| 13 | | | 1.03 | 1.03 | 0.0 | 72.0 | | | | | | | | | | |
| 14 | 479 | 2.5 | 1.02 | 1.02 | 0.0 | 72.0 | | | | | | | | | | |
| 15 | 478 | 4.9 | 1.04 | 1.00 | 3.0 | 75.0 | 2.34 | 7.28 | 9.62 | 431 | 10.08 | 427 | 42.48 | 61.94 | 34.75 | 22.33 |
| 16 | 480 | 5.0 | 1.01 | 1.01 | 0.0 | 75.0 | | | | | | | | | | |
| 17 | 484 | 6.7 | 1.03 | 1.00 | 2.0 | 77.0 | | | | | | | | | | |
| 18 | 486 | 5.7 | 1.04 | 1.00 | 2.5 | 79.5 | | | | | | | | | | |
| 19 | 488 | 4.9 | 0.98 | 0.98 | 0.0 | 79.5 | 1.96 | 8.14 | 10.10 | 448 | 18.00 | 356 | 46.32 | 64.68 | 68.03 | 14.44 |
| 20 | 491 | | 1.03 | 1.03 | 0.0 | 79.5 | | | | | | | | | | |
| 21 | 494 | 4.5 | 1.03 | 1.00 | 2.0 | 81.5 | | | | | | | | | | |
| 22 | 497 | | 0.99 | 0.99 | 0.0 | 81.5 | 1.73 | 8.57 | 10.30 | 479 | 19.00 | 393 | 47.92 | 69.68 | 72.23 | 18.56 |
| 23 | 501 | 4.5 | 1.02 | 1.02 | 0.0 | 81.5 | | | | | | | | | | |
| 24 | 504 | 3.8 | 1.01 | 1.01 | 0.0 | 81.5 | | | | | | | | | | |
| 25 | 507 | 3.4 | 1.00 | 1.00 | 0.0 | 81.5 | | | | | | | | | | |
| 26 | 508 | | 1.04 | 1.00 | 3.0 | 84.5 | | | | | | | | | | |
| 27 | 509 | 4.9 | 1.01 | 1.01 | 0.0 | 84.5 | | | | | | | | | | |
| 28 | 509 | 5.5 | 1.02 | 1.02 | 0.0 | 84.5 | | | | | | | | | | |
| 29 | 509 | | 1.01 | 1.01 | 0.0 | 84.5 | 1.40 | 9.10 | 10.50 | 555 | 23.00 | 450 | 49.52 | 81.94 | 89.03 | 24.89 |
| 30 | 509 | | 1.02 | 1.02 | 0.0 | 84.5 | | | | | | | | | | |
| 31 | 508 | 4.5 | 1.01 | 1.01 | 0.0 | 84.5 | | | | | | | | | | |
| 32 | 508 | 4.8 | 0.99 | 0.99 | 0.0 | 84.5 | | | | | | | | | | |
| 33 | 508 | 4.6 | 1.05 | 1.01 | 3.0 | 87.5 | | | | | | | | | | |
| 34 | 507 | 4.9 | 1.04 | 1.00 | 3.0 | 90.5 | | | | | | | | | | |
| 35 | 508 | 4.9 | 0.98 | 0.98 | 0.0 | 90.5 | | | | | | | | | | |
| 36 | 505 | 4.7 | 0.83 | 0.83 | 0.0 | 90.5 | 1.12 | 9.78 | 10.90 | 574 | 22.00 | 534 | 52.72 | 85.00 | 84.83 | 34.22 |

TABLE 2

Feed: 300 g Desseminated Ore (79% passing 200 mesh)
3 L of Active Chalcopyrite Culture
Head Grade: Fe (%) 12.5, Cu (%) 0.9, Ni (%) 0.62, Co (ppm) 238, S (%) 4.05    Temperature: 45° C.    Operating pH: 1.00

| Day | ORP mV | DO (mg/L) | pH 1 | pH 2 | Acid Added (ml) | Cum. Acid (ml) | Fe++ (g/l) | Fe+++ (g/l) | Fe Tot (g/l) | Ni (mg/L) | Co (mg/L) | Cu (mg/L) | Fe (%) | Ni (%) | Co (%) | Cu (%) |
|---|---|---|---|---|---|---|---|---|---|---|---|---|---|---|---|---|
| 0 | 392 | | 2.28 | 0.94 | 33.0 | 33.0 | 3.63 | 0.97 | 4.60 | 37 | 1.73 | 561 | 0.00 | 0.00 | 0.00 | 0.00 |
| 1 (1 am) | 409 | 3.1 | 1.03 | 0.95 | 6.0 | 39.0 | | | | | | | | | | |
| 1 (1 pm) | 410 | | 1.02 | 0.95 | 6.0 | 45.0 | | | | | | | | | | |
| 2 | 411 | 2.8 | 1.04 | 0.95 | 7.0 | 52.0 | | | | | | | | | | |
| 3 | 415 | 3.2 | 1.01 | 0.96 | 3.0 | 55.0 | | | | | | | | | | |
| 4 | 418 | 3.6 | 1.08 | 1.00 | 5.0 | 60.0 | | | | | | | | | | |
| 5 | 422 | 3.0 | 1.01 | 1.01 | 0.0 | 60.0 | 5.03 | 2.49 | 7.52 | 122 | 3.33 | 624 | 23.36 | 13.71 | 6.72 | 7.00 |
| 6 | 423 | 4.1 | 1.02 | 1.02 | 0.0 | 60.0 | | | | | | | | | | |
| 7 | 425 | 3.2 | 1.04 | 1.00 | 3.0 | 63.0 | | | | | | | | | | |
| 8 | 426 | 2.1 | 1.06 | 1.00 | 3.0 | 66.0 | 5.53 | 3.01 | 8.54 | 155 | 4.2 | 669 | 31.52 | 19.03 | 10.38 | 12.00 |
| 9 | 427 | 2.6 | 1.01 | 1.01 | 0.0 | 66.0 | | | | | | | | | | |
| 10 | 426 | 2.8 | 1.04 | 1.00 | 2.0 | 68.0 | | | | | | | | | | |
| 11 | 427 | 2.8 | 1.01 | 1.01 | 0.0 | 68.0 | | | | | | | | | | |

TABLE 2-continued

| 12 | 463 | 3.1 | 1.03 | 1.00 | 2.0 | 70.0 | 6.09 | 3.07 | 9.16 | 214 | 5.22 | 987 | 36.48 | 28.55 | 14.66 | 47.33 |
|---|---|---|---|---|---|---|---|---|---|---|---|---|---|---|---|---|
| 13 |  |  | 1.03 | 1.03 | 0.0 | 70.0 |  |  |  |  |  |  |  |  |  |  |
| 14 | 422 | 2.7 | 1.05 | 1.05 | 0.0 | 70.0 |  |  |  |  |  |  |  |  |  |  |
| 15 | 420 | 5.5 | 1.08 | 1.00 | 5.0 | 75.0 | 7.21 | 2.57 | 9.78 | 243 | 5.54 | 1400 | 41.44 | 33.23 | 16.01 | 93.22 |
| 16 | 424 | 4.8 | 1.03 | 1.00 | 2.0 | 77.0 |  |  |  |  |  |  |  |  |  |  |
| 17 | 427 | 5.4 | 0.98 | 0.98 | 0.0 | 77.0 |  |  |  |  |  |  |  |  |  |  |
| 18 | 427 | 5.6 | 1.02 | 1.00 | 1.0 | 78.0 |  |  |  |  |  |  |  |  |  |  |
| 19 | 430 | 4.8 | 1.01 | 1.01 | 0.0 | 78.0 | 5.87 | 4.23 | 10.10 | 234 | 5.96 | 1450 | 44.00 | 31.77 | 17.77 | 98.78 |

The invention claimed is:

1. A method for the bacterially assisted heap leaching of chalcopyrite, the method comprising the steps of:
   providing a chalcopyrite containing ore heap to oxidise sulphide minerals therein, the heap containing and/or being inoculated with a sulphide oxidising bacterial culture that either does not oxidise ferrous to ferric, or is inefficient at doing so;
   providing a leach solution container, from which feed solution is fed to the heap, and which receives leach solution from the heap; and
   bleeding a portion of the leach solution and passing same to a means for metals recovery.

2. The method of claim 1 wherein said leach solution container comprises a first leach solution pond.

3. A method according to claim 2, wherein the first leach solution pond is maintained with a low ferric concentration relative to that of ferrous.

4. A method according to claim 2, wherein the first leach solution pond is maintained with an oxidation reduction potential of below 500 mV relative to Ag/AgCl$_2$ standard reference.

5. A method according to claim 2, wherein the first leach solution pond is maintained such that the prevailing chemical conditions are conducive to leaching the chalcopyrite whilst being non-conducive to surface passivation.

6. A method according to claim 2, wherein the ore heap is aerated at or near a base thereof.

7. A method according to claim 2, wherein the oxidation of the chalcopyrite is achieved through the action of chemolithotrophic bacteria.

8. A method according to claim 2, wherein the method additionally comprises providing a biological contactor inoculated with ferrous oxidising bacteria and a second leach solution pond from which leach solution is fed to the biological contactor and which receives leach solution from the biological contactor.

9. A method according to claim 8, wherein leach solution from the first leach pond is able to be fed to the biological contactor.

10. A method according to claim 8, wherein leach solution is able to be fed from the second leach pond to the first leach pond, whereby the level of ferric and/or the pH value in the first leach pond may be controlled to a large extent.

11. A method according to claim 8, wherein leach solution is bled from the biological contactor for passing to a means for metals recovery, the levels of ferric therein facilitating metal recovery.

12. A method according to claim 2, wherein the biological contactor is provided in the form of a second heap.

13. A method according to claim 12, wherein the second heap is formed of relatively inert waste rock inoculated with ferrous oxidising bacteria.

* * * * *